United States Patent
Cekleov et al.

(10) Patent No.: US 7,802,153 B1
(45) Date of Patent: Sep. 21, 2010

(54) TRAINABLE LINK

(75) Inventors: Michel P. Cekleov, Mountain View, CA (US); Christopher Cheng, Cupertino, CA (US); Greg L. Dykema, Redwood City, CA (US); David Chu, Santa Clara, CA (US)

(73) Assignee: 3PAR, Inc., Fremont, CA (US)

( * ) Notice: Subject to any disclaimer, the term of this patent is extended or adjusted under 35 U.S.C. 154(b) by 913 days.

(21) Appl. No.: 11/608,241

(22) Filed: Dec. 7, 2006

(51) Int. Cl.
*G01R 31/28* (2006.01)
*H04L 7/00* (2006.01)
*H04B 17/00* (2006.01)
*G06F 11/00* (2006.01)

(52) U.S. Cl. .................. 714/712; 714/821; 375/224; 375/354; 370/241

(58) Field of Classification Search ............. 714/715, 714/712, 758, 799, 821; 370/241, 252, 503, 370/509; 375/224–228, 354, 355, 357
See application file for complete search history.

(56) References Cited

U.S. PATENT DOCUMENTS

| | | | | |
|---|---|---|---|---|
| 5,710,910 | A * | 1/1998 | Kehl et al. | 713/400 |
| 6,760,772 | B2 * | 7/2004 | Zou et al. | 709/230 |
| 7,000,031 | B2 * | 2/2006 | Fischer et al. | 709/248 |
| 7,068,727 | B1 * | 6/2006 | Lo et al. | 375/295 |
| 7,328,359 | B2 * | 2/2008 | Frodsham et al. | 713/400 |
| 7,369,634 | B2 * | 5/2008 | Panikkar et al. | 375/354 |
| 7,672,414 | B2 * | 3/2010 | Page | 375/355 |
| 2002/0041570 | A1 * | 4/2002 | Ptasinski et al. | 370/252 |
| 2006/0268941 | A1 * | 11/2006 | Paulson et al. | 370/503 |

OTHER PUBLICATIONS

Elrabaa, M.E.S.; , "A Digital Clock Re-Timing Circuit for On-Chip Source-Synchronous Serial Links," Microelectronics, 2006. ICM '06. International Conference on , vol., No., pp. 206-209, Dec. 16-19, 2006 doi: 10.1109/ICM.2006.373303.*

Jaussi, J.E.; Balamurugan, G.; Johnson, D.R.; Casper, B.; Martin, A.; Kennedy, J.; Shanbhag, N.; Mooney, R.; , "8-Gb/s source-synchronous I/O link with adaptive receiver equalization, offset cancellation, and clock de-skew," Solid-State Circuits, IEEE Journal of , vol. 40, No. 1, pp. 80-88, Jan. 2005 doi: 10.1109/JSSC.2004.838009.*

* cited by examiner

*Primary Examiner*—Cynthia Britt
(74) *Attorney, Agent, or Firm*—Patent Law Group LLP; David C. Hsia

(57) ABSTRACT

A method is provided to align clock and data signals over a source-synchronous link. The method includes sending header data and a default clock signal over the link. The header indicates a start of a training packet and the default clock signal ensures that the header is received without error. The method further includes providing a long clock pulse, phase shifting the clock signal during the long clock pulse, and thereafter sending training data and the clock signal over the link. The above steps are repeated until the training data are received with error. At that point, the phase shift of the clock signal is saved as a boundary of an optimal alignment. The above steps are then repeated with the clock signal shifted in a different direction. Once another boundary is located, the boundary midpoint is saved as the phase shift that provides the optimal alignment.

18 Claims, 11 Drawing Sheets

TRAINABLE LINK

FIELD OF INVENTION

This invention relates to source-synchronous communication over a link between nodes.

DESCRIPTION OF RELATED ART

In the past, communication protocols have used synchronous data clocking where a system clock generates a clock signal over a communication link (also referred to as a "strobe" signal) to both a sender and a receiver in the system. On a rising edge of the clock signal, the flip-flop of the sender provides a data signal on a wire between the sender and the receiver. On the following rising edge of the clock signal, the flip-flop of the receiver captures the data on the wire from the sender. The clock distribution is designed so the clock signal arrives at the sender and the receiver at relatively the same time to meet setup and hold times of the flip-flops and minimize errors. However, this becomes difficult when the system uses a high clock frequency and when the system becomes large so that the sender and the receiver are far apart.

Modern communication protocols often use source-synchronous data clocking where a sender provides a data signal and a clock signal to a receiver. The clock signal is aligned with the data signal to meet setup and hold times of the flip-flops under possible data and clock skews.

A delay lock loop (DLL) aligns the clock signal, on either the sender or the receiver side, with the data signal. The DLL may be programmed so that a number of inverters are connected serially to form a delay line that generates the desired delay.

SUMMARY

In one embodiment of the invention, a method provides the optimal alignment between a clock signal and a data signal in a source-synchronous communication link between a sender and a receiver. The method includes sending header data and the clock signal with a default phase shift over the link. The header data indicate a start of a training packet and the clock signal with the default phase shift ensures that the header data are received without error. The method further includes providing a long clock pulse, adjusting the phase of the clock signal during the long clock pulse, and sending training data and the clock signal over the link.

In one embodiment, a pseudo-random number generator in the sender generates the training data. A counterpart in the receiver using an identical seed value generates corresponding data that are compared with the data from the sender to detect transmission errors.

In one embodiment, the above steps are repeated until one or more transmission errors are detected. At that point, the phase shift of the clock signal is recorded as a first boundary of the optimal alignment. The above steps are then repeated with the clock signal shifted in a different direction. When a second boundary is located, the boundary midpoint is saved as the phase shift that provides the optimal alignment.

BRIEF DESCRIPTION OF THE DRAWINGS

Use of the same reference numbers in different figures indicates similar or identical elements.

DETAILED DESCRIPTION

Source-Synchronous Communication Link

Figure 1:
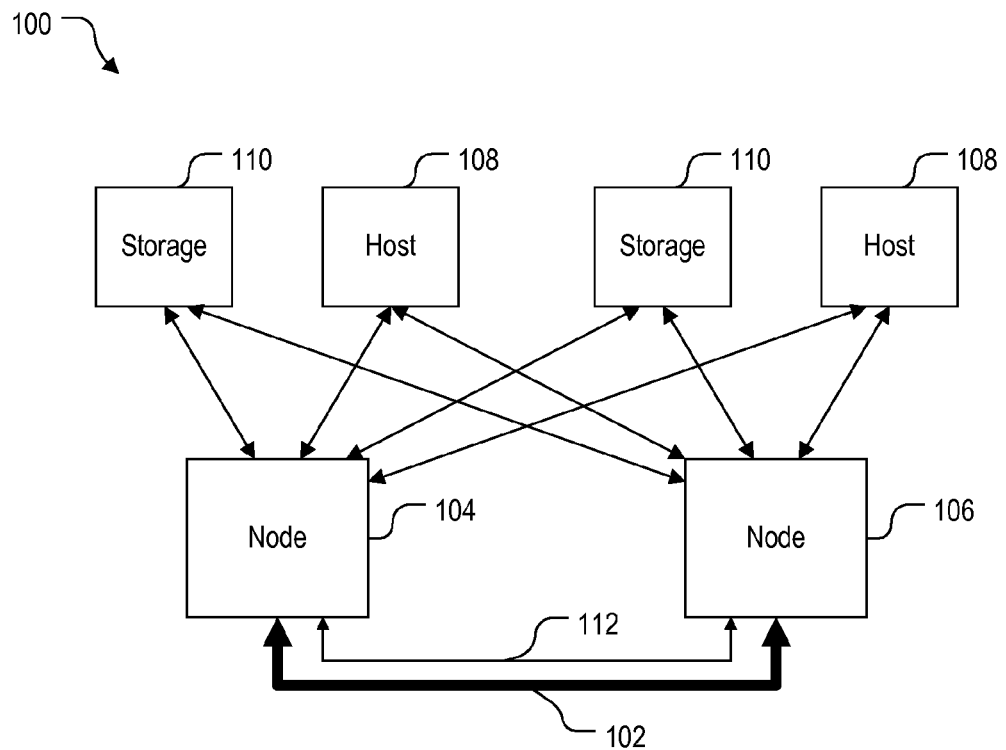
FIG. 1 is a block diagram of a system with a source-synchronous high-speed communication link between nodes in one embodiment of the invention.

FIG. 1 illustrates a system 100 with a source-synchronous high-speed communication link 102 between nodes 104 and 106 in one embodiment of the invention. For example, system 100 is a data storage system with hosts devices 108 and storage devices 110 each coupled to two nodes for redundancy. Host devices 108 use nodes 104 and 106 to access a virtual volume implemented on storage devices 110. Nodes 104 and 106 communicate with each other over link 102 to access storage devices 110. Nodes 104 and 106 can further communicate with each other over a side band connection 112, such as a serial link, to communicate other information. System 100 may include additional nodes, host devices, and storage devices.

Figure 2:
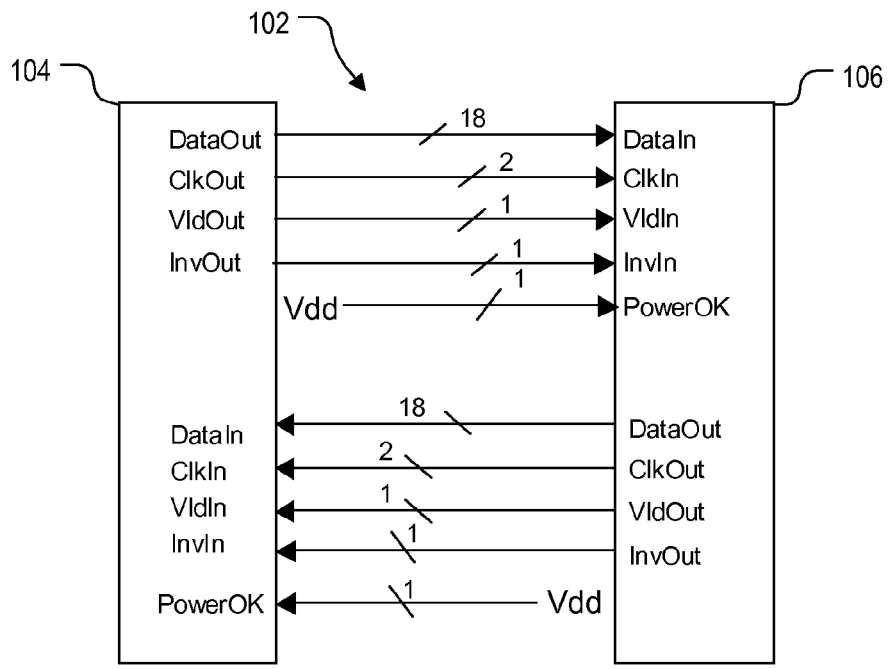
FIG. 2 is a block diagram of connections in the link between the nodes of FIG. 1 in one embodiment of the invention.

FIG. 2 illustrates the connections in link 102 between nodes 104 and 106 in one embodiment of the invention. The connections in link 102 are described in the following table.

TABLE 1

| \multicolumn{4}{c}{Connections in Link.} |
| Name | Width | Direction | Description |
| --- | --- | --- | --- |
| DataIn | 18 | Input | Data + error correction code (ECC) in from link. DataIn[17:16] are the ECC[1:0] signals. |
| ClkIn | 2 | Input | Differential clock in from link (Strobe and Strobe_). |
| VldIn | 1 | Input | Valid signal for incoming data used for re-synchronization with receiver clock. |
| InvIn | 1 | Input | If set to 1, DataIn should be inverted to get the actual value of data. Data may be inverted to minimize the number of signals that are switching in any given cycle. |
| PowerOK | 1 | Input | Signal that indicates the other end of the link has power. |
| DataOut | 18 | Output | Data + ECC to link. DataOut[17:16] are the ECC[1:0] signals. |
| ClkOut | 2 | Output | Differential clock out to link. |
| VldOut | 1 | Output | Valid signal for outgoing data used for re-synchronization with sender clock. |

TABLE 1-continued

Connections in Link.

| Name | Width | Direction | Description |
|---|---|---|---|
| InvOut | 1 | Output | If set to 1, the DataOut should be inverted to get the actual value of data. |

The Vld signal (i.e., VldOut at the sending node and VldIn at the receiving node) is used to encode valid header, data, and dummy cycles. The combination of the values of the Vld signal on the rising and the falling edges of the clock signal encodes the cycles as shown in the following table.

TABLE 2

Definition of Vld Signals.

| Vld (rising, falling) | Cycle Meaning |
|---|---|
| (0, 0) | Padding (i.e., idle) cycle dropped by receiver. |
| (0, 1) | First cycle of packet, loaded by receiver using the clock signal issued by the sender. |
| (1, 0) | Valid cycle with running parity of the Inv signal = 0, loaded by receiver using the clock signal issued by the sender. |
| (1, 1) | Valid cycle with running parity of the Inv signal = 1, loaded by receiver using the clock signal issued by the sender. |

Figure 3:
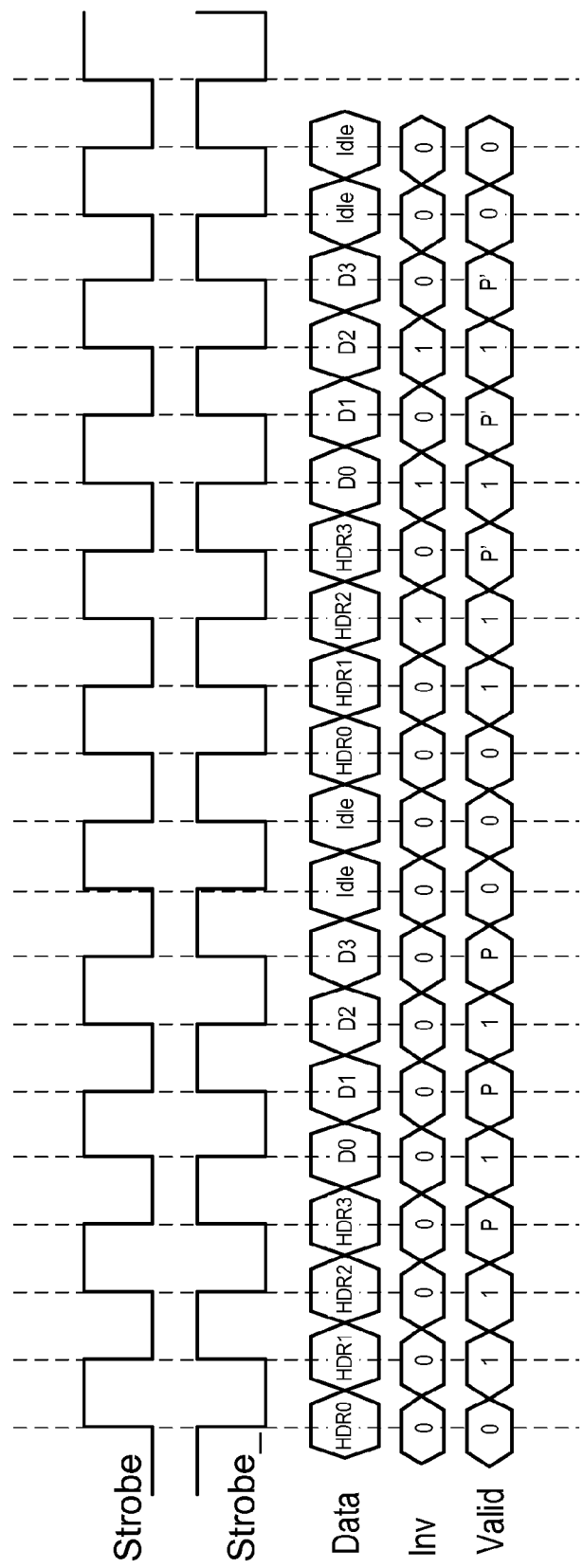
FIG. 3 is a timing diagram of exemplary communication over the link of FIG. 1 in one embodiment of the invention.

FIG. 3 illustrates exemplary communication over link 102 in one embodiment of the invention. Data and control information are transmitted in packets. A packet carries a header quadword (i.e., four 16 bit words for a total of 64 bits) followed by 1, 8, or 16 data quadwords. In FIG. 3, a first packet is sent with one header quadword and one data quadword in the first four cycles (i.e., 8 clock edges). The first packet is followed by an idle cycle (i.e., 2 clock edges), a second packet with one header quadword and one data quadword in the next four cycles, and then one more idle cycle.

Since a single error in the Inv signal corrupts 18 bits of data (both data and ECC) and this error may not be detected by the ECC code, it is important to cover the Inv signal with parity. Instead of using a separate parity signal, a running even parity of the Inv signal is encoded in the pair of Vld values on the edges for half of the header and all non-idle cycles. Even parity is set so the sum of the number of 1's in the Inv signal and the parity bit itself is even.

Referring to Table 2 and FIG. 3, the generation of the even parity using the Vld signal is further explained. In FIG. 3, the running even parity for the Inv signal generated as part of the Vld signal is labeled P for the first packet and P' for the second packet. In the first packet, the Inv signal is not asserted so the data signals are not inverted. As the Inv signal is always 0 for an even number of half cycles each time a new value of P is generated, P is always 0 for the first packet.

In the second packet, the Inv signal is asserted to indicate when the values of the data signals are inverted to minimize the noise linked to multiple signals switching simultaneously with the same transition. As the Inv signal is 1 for an odd number of half cycles each time a new value of P' is generated, P' is always 1 for the second packet.

Figure 4A:
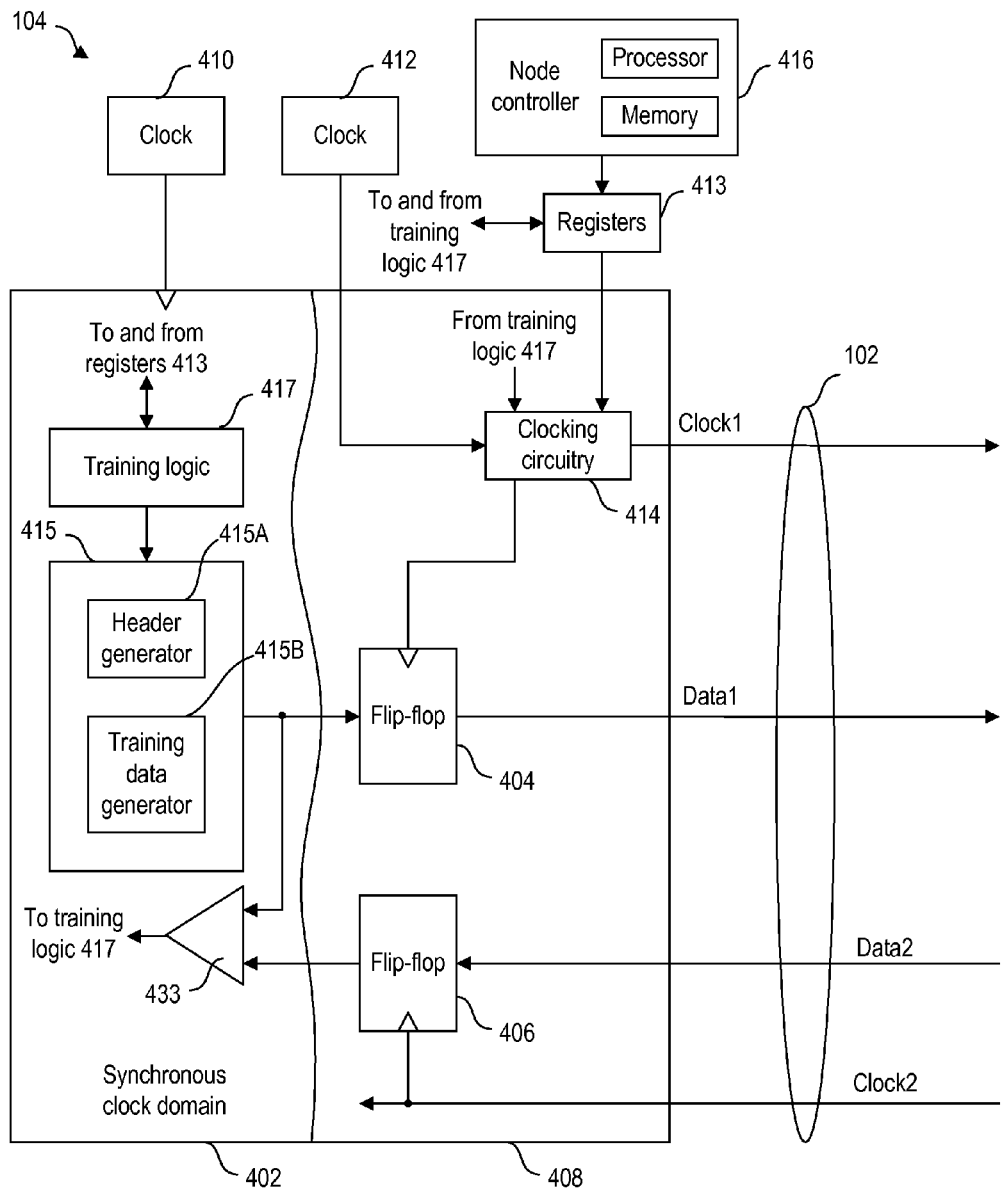
FIGS. 4A and 4B form a block diagram of circuitry in the nodes for communicating over the link of FIG. 1 in one embodiment of the invention.
Figure 4B:
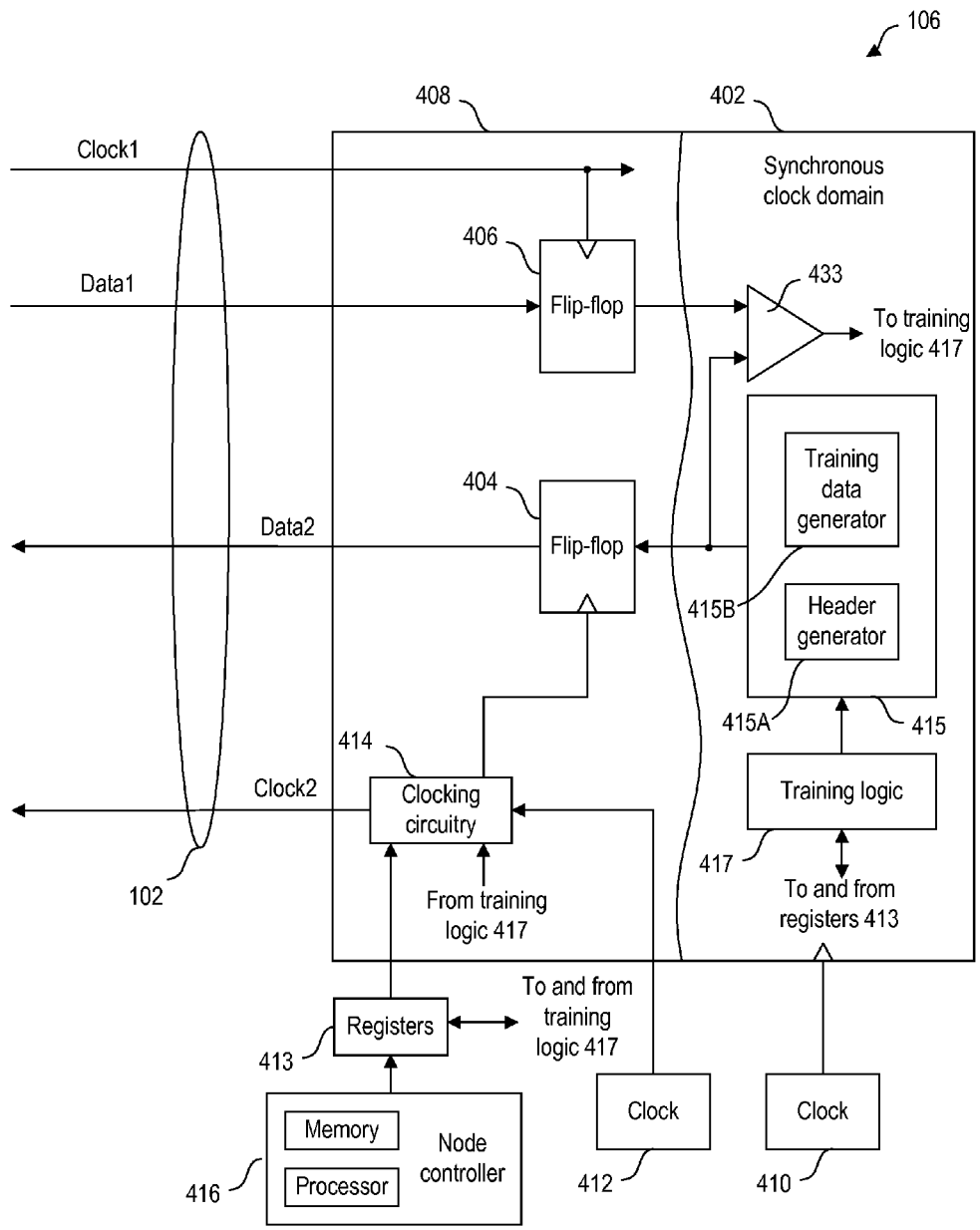

FIGS. 4A and 4B illustrate a more detailed view of link 102 between nodes 104 and 106 in one embodiment of the invention. For simplicity, only one data line and one clock line are shown in either direction of link 102.

Referring to FIG. 4A, node 104 includes components in a synchronous clock domain 402. The components in synchronous clock domain 402 send and receive data via flip-flops 404 and 406 in an input/output (I/O) interface 408 with link 102. A clock 410 provides a clock signal to the components in synchronous clock domain 402.

Flip-flop 404 receives data signal from the components in synchronous clock domain 402. A clock 412 provides the clock signal that causes flip-flop 404 to provide the data signal on link 102. Clock 412 also provides the clock signal that accompanies the data signal on link 102.

During normal operations, flip-flop 404 receives real data from the components synchronous clock domain 402. During link training for optimizing link 102 when node 104 is the sender, flip-flop 404 receives training data from a training packet generator 415. Training packet generator 415 includes a header generator 415A and a training data generator 415B. Header generator 415A generates a pseudo-header that indicates the start of a training packet. Training data generator 415B generates random training data. Training data generator 415B is a pseudo-random number generator (hereafter referred to as "RNG").

During link training when node 104 is the receiver, flip-flop 406 outputs training data from node 106 to an error detector 433 that checks for data mismatch error and parity error. Error detector 433 has circuitry for receiving expected data from the RNG in training packet generator 415 and comparing them against the training data received from node 106. Error detector 433 further has circuitry for reading the Vld signals and checking the parity of the Inv signals.

A clocking circuitry 414 is located in the clock signal path to link 102. Clocking circuitry 414 provides the desired delay (i.e., phase shift) to the clock signal so the clock signal and the data signal are properly aligned when they arrive at node 106. A node controller 416 writes registers 413 to set a programmable delay value to clocking circuit 414. Node controller 416 also writes registers 413 to cause a training logic 417 to start the link training.

Training logic 417 provides overall control of the link training by generating control signals to clocking circuitry 414 and training packet generator 415. Training logic 417 also writes the results of the link training to registers 413. Node controller 416 can be a processor operating under instructions stored in a memory. Training logic 417 can be an application specific integrated circuit (ASIC) or part of an ASIC designed from a hardware description language to perform the functions described herein.

Flip-flop 406 receives data and clock signals over link 102 from node 106. The data signal is clocked into flip-flop 406 by the accompanying clock signal.

Node 106 is similarly constructed as node 104 so that corresponding components are identified by the same reference numerals in FIG. 4B.

Figure 5:
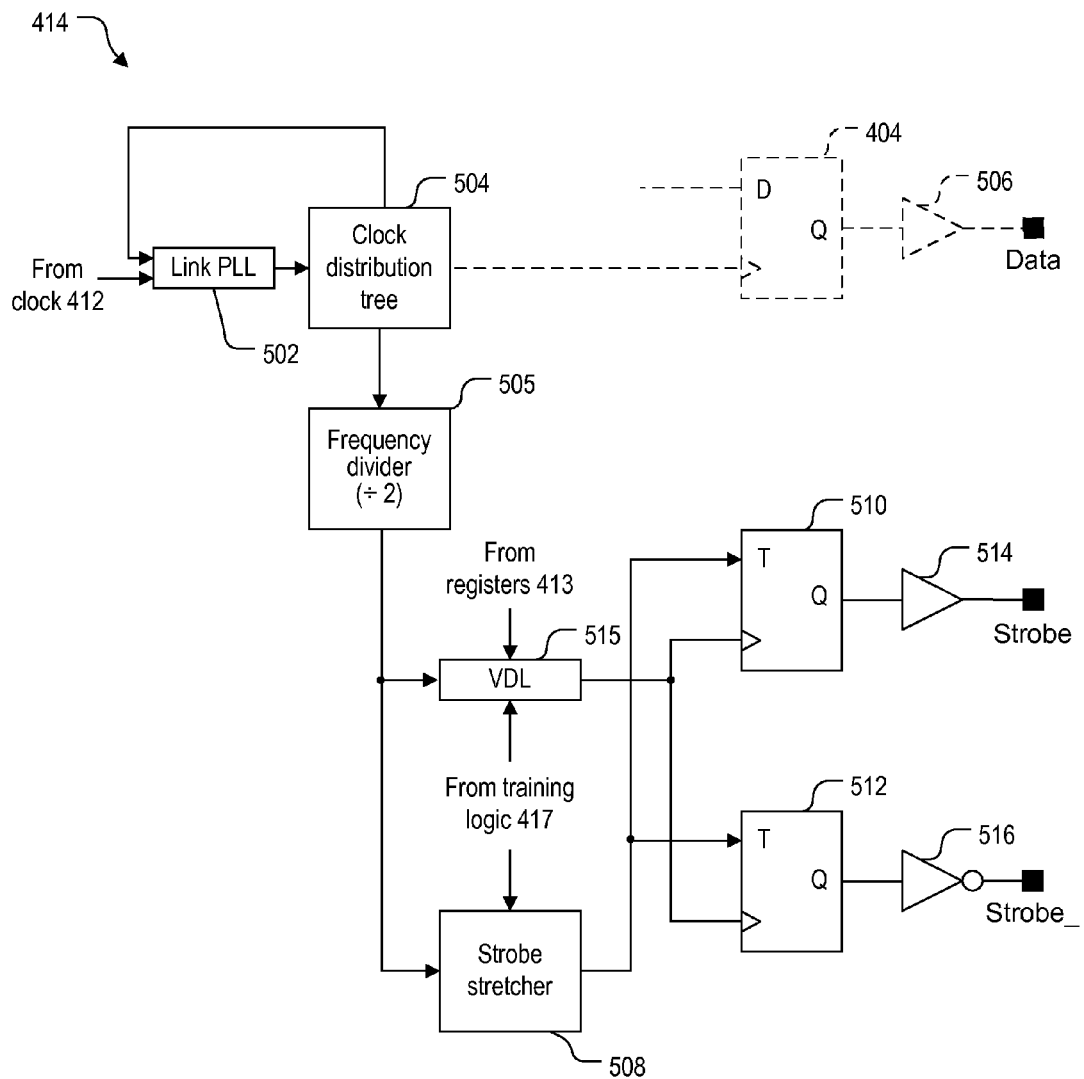
FIG. 5 is a block diagram of clocking circuitry in the node circuitry of FIGS. 4A and 4B in one embodiment of the invention.

FIG. 5 illustrates a detailed view of one embodiment of clocking circuitry 414 in node 102. For simplicity, only one data line and two clock lines are shown. A link phase-locked loop (PLL) circuit 502 receives a clock signal from clock 412 and generates a clock signal to a clock distribution tree 504. Clock distribution tree 504 supplies the clock signal to multiple components. The clock signal is fed back to PLL 502 to maintain a fixed phase relationship between the input clock signal to PLL 502 and the input clock signal to clock distribution tree 504. The clock signal is provided to flip-flop 404 to cause them to provide data signals to link 102. In one embodiment, flip-flop 404 is a D-type flip flop. Flip-flop 404 may be coupled to an amplifier 506 to drive the data signals.

Clock distribution tree 504 further provides the clock signal to inputs of a frequency divider 505. Frequency divider 505 provides the clock signal at half of the original frequency to a strobe stretcher 508 and a programmable variable delay line (VDL) 515. Strobe stretcher 508 has an output coupled to control terminals of flip-flops 510 and 512. Programmable VDL 515 has an output coupled to clock inputs of flip-flops 510 and 512. When control terminals of flip-flops 510 and 512 receive a control signal in a first state from strobe stretcher 508, flip-flops 510 and 512 output their clock inputs from programmable VDL 515. When the control signal is in a second state, flip-flops 510 and 512 hold their current output constant. In one embodiment, flip-flops 510 and 512 are T-type flip-flops. Flip-flop 510 has an output coupled to the input of an output buffer 514 while flip-flop 512 has an output coupled to the input of an inverting output buffer 516. Together flip-flops 510 and 512 provide differential strobe signals on link 102 to double the data transfer rate. The outputs of buffers 514 and 516 are coupled to Strobe and Strobe_pads.

During normal operation, strobe stretcher 508 provides the control signal in the first state to the control terminals of flip-flops 510 and 512. When enabled by training logic 417 during link training, strobe stretcher 508 provides the control signal in the second state in order to hold the strobe signals constant for several clock cycles while training logic 417 updates the programmable delay of programmable VDL 515. Strobe stretcher 508 times its actions using the clock signal from frequency divider 505. Strobe stretcher 508 can be an ASIC or part of an ASIC designed from a hardware description language to perform the functions described herein.

Figure 6:
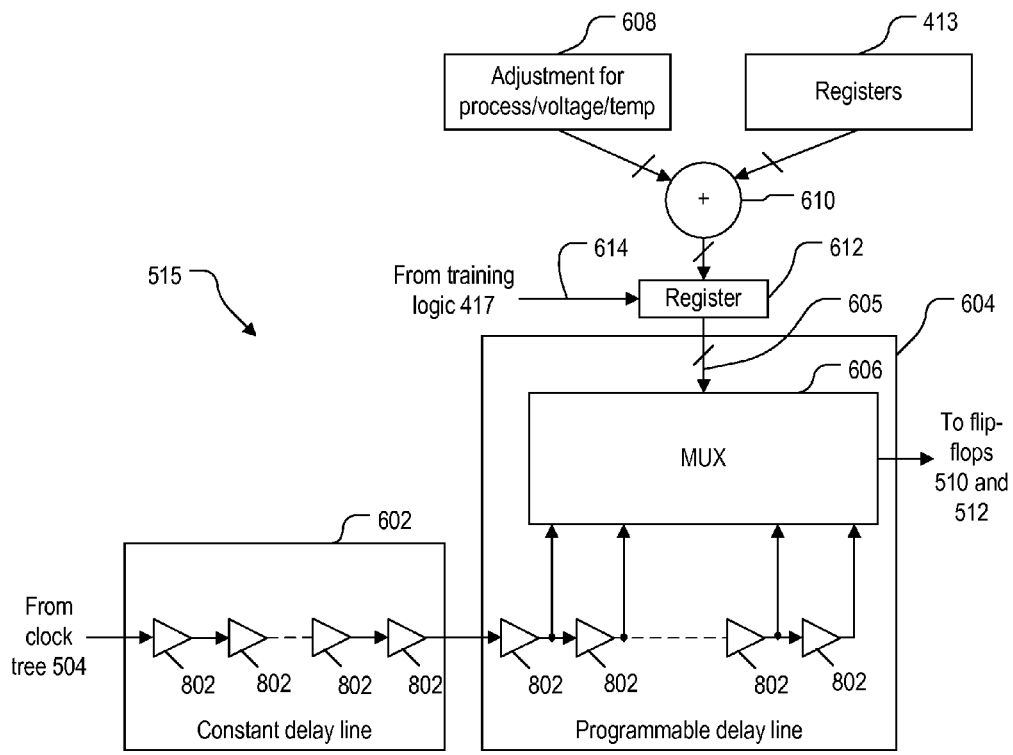
FIG. 6 is a block diagram of a variable delay line (VDL) in the clocking circuitry of FIG. 5 in one embodiment of the invention.

FIG. 6 illustrates a block diagram of programmable VDL 515 in one embodiment of the invention. Programmable VDL 515 includes a constant delay line 602 and a programmable delay line 604. Constant delay line 602 receives the clock signal and outputs a first delayed clock signal. In one embodiment, constant delay line 602 consists of serially connected delay cells or gates 802.

Programmable delay line 604 receives the first delayed clock signal and outputs a second delayed clock signal. Programmable delay line 604 has a default programmable delay. The programmable delay can be incremented or decremented by changing select signals 605. With the default programmable delay and the constant delay, programmable VDL 515 provides a default clock delay that properly aligns the data and the clock signals when they reach their destination. Programmable delay line 604 consists of serially connected delay cells 802 and a multiplexer 606 having inputs that tap into the outputs of delay cells 802. Select signals 605 select the output of multiplexer 606 from one of the inputs from delay cells 802.

A compensation circuitry 608 outputs a process/voltage/temperature (PVT) delay value according to process, voltage, and temperature variations. Registers 413 outputs a programmable delay value set by node controller 416. An adder 610 adds the PVT and the programmable delay values to form a composite delay value for programmable delay line 604.

A local register 612 has it input coupled to the output of adder 610. In response to a control signal 614 from training logic 417, local register 612 loads the composite delay value from adder 610 into memory. Local register 612 outputs the composite delay value as select signals 605 to multiplexer 606 to set the programmable delay of programmable delay line 604. Thus, the VDL delay is updated only when training logic 417 issues control signal 614 to local register 612.

Glitches in the clock signal can occur when programmable delay line 604 is updated while a clock pulse propagates through delay cells 802. One type of glitch occurs when multiplexer 606 selects a delay cell that the clock pulse is currently propagating through so that the clock pulse is in transition. This glitch results in a poorly formed clock output from programmable delay line 604 that does not properly clock flip-flops 510 and 512 to generate the strobe signals. Another type of glitch occurs when multiplexer 606 selects a delay cell that the clock pulse has propagated past. This glitch results in missing strobe signals that causes the receiver node to miss data from the sending node. These glitches are eliminated by the use of a long clock pulse while programmable delay line 604 is updated as described later in detail.

Figure 7:
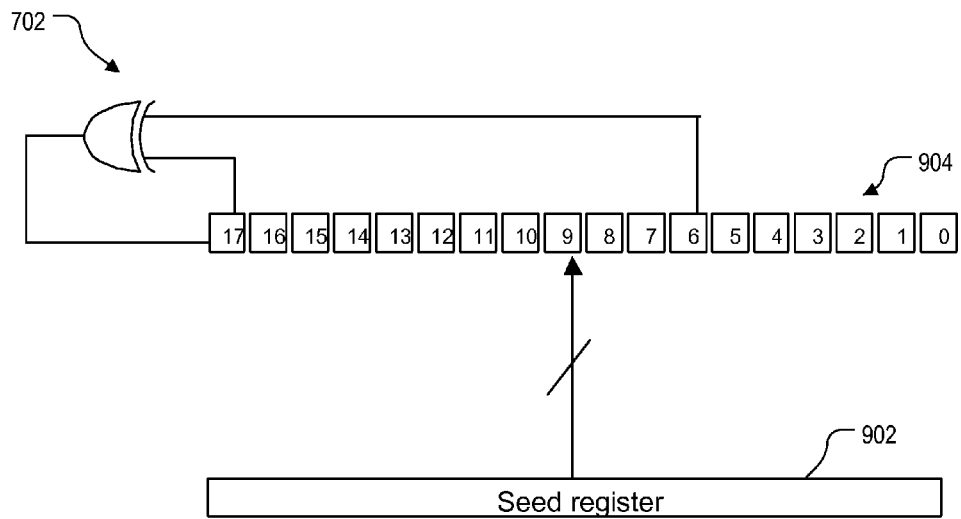
FIG. 7 is a block diagram of a pseudo-random number generator in the node circuitry of FIGS. 4A and 4B in one embodiment of the invention.

FIG. 7 illustrates a RNG 702 in training data generator 415B (FIG. 3 or 4) in one embodiment of the invention. RNG 702 includes a Linear-Feedback-Shift Register (LFSR) 904 that generates the training data. LFSR 904 receives a seed value from registers 413, which is programmed by node controller 416. In one embodiment, LFSR 904 is 18 bits long and has taps at bits 6 and 17 that are combined and fed back as an input to LFSR 904. The two taps ensure that LFSR 904 will sequence through 262,143 different values before returning to the seed value. The two taps are combined by an XOR gate to ensure that the output of LFSR 904 with all bits equal to 0 is not generated. During link training described later, each bit of the RNG is coupled to a corresponding data bit on link 102 to generate training data.

Link Training

In link training, software executed on node controllers 416 at sending and receiving nodes perform steps to determine the optimal alignment between a clock signal and a data signal arriving at the receiving node over link 102. In one embodiment, the BIOS on node controller 416 at the sending node starts the link training at startup or upon user request.

Figure 8:
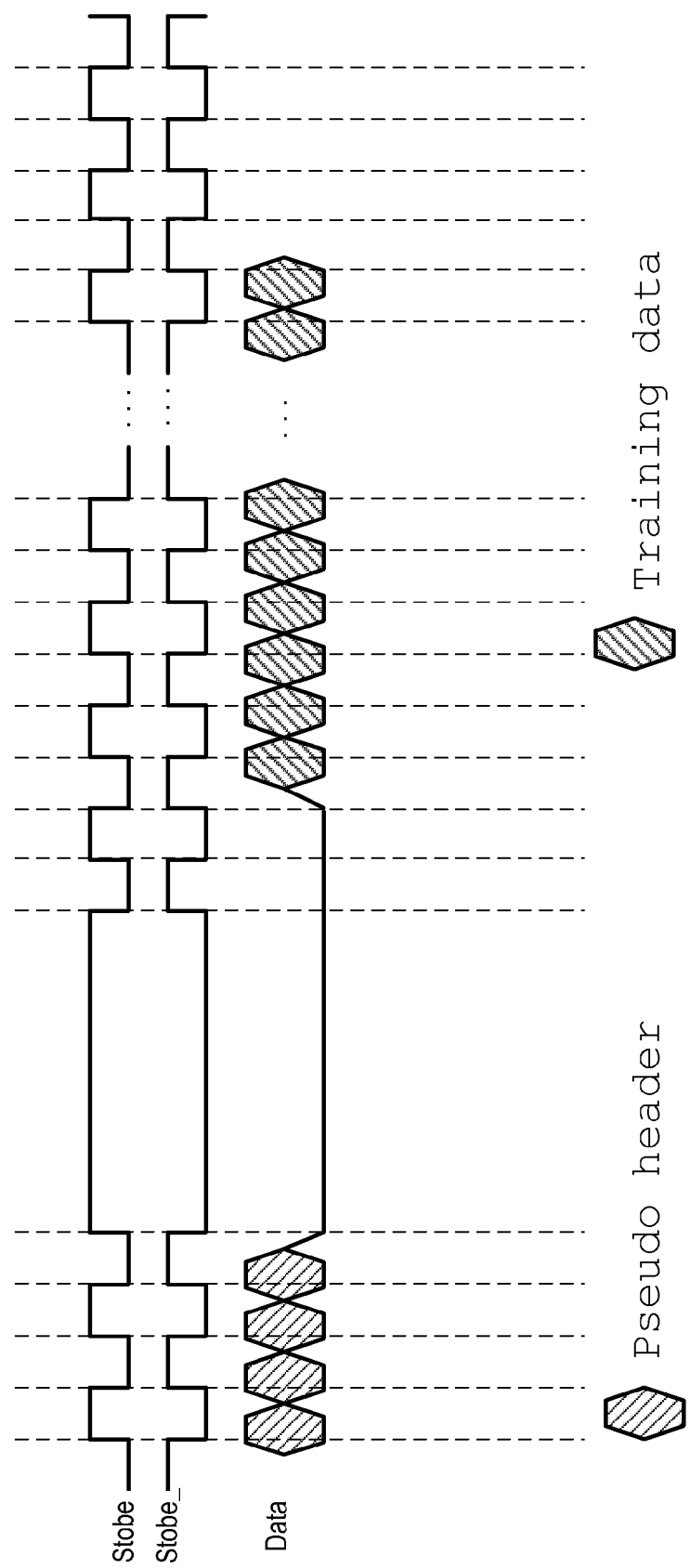
FIG. 8 is a timing diagram illustrates exemplary header data, training data, and clock signal over the link of FIG. 1 in one embodiment of the invention.

FIG. 8 illustrates the timing of a training packet from a sending node (e.g., node 104) to a receiving node (e.g., node 106). First, training logic 417 at node 104 causes training packet generator 415 to send a pseudo-header to inform node 106 of the start of the training packet. The pseudo-header comprises a header quadword with all 18 bits (data and ECC) set to 1.

For the pseudo-header, clocking circuit 414 at node 104 provides a clock signal with the default clock delay (i.e., the combination of the constant delay and the default programmable delay of programmable VDL 515). With the default clock delay and the appropriate system design, node 106 is able to properly capture the pseudo-header. The default clock delay satisfies the worst case scenario but it is not optimized for any specific conditions.

Note that prior to sending the training packet, node controllers 416 at nodes 104 and 106 exchange an identical seed value shared by the RNGs in nodes 104 and 106. Node controllers 416 at nodes 104 and 106 can exchange the RNG seed value using normal packets over link 102 with the default clock delay. Alternatively, node controllers 416 at nodes 104 and 106 can exchange the RNG seed value using side band connection 112.

After the pseudo-header, training logic 417 at node 104 enables strobe stretcher 508 to send a long clock pulse (i.e., holding the clock in one state) over link 102 to node 106. Once enabled, strobe stretcher 508 holds the state of the clock signal constant for several clock cycles. During the long clock pulse, training logic 417 updates programmable delay line 604 with a new programmable delay.

The long clock pulse masks any glitches that may occur when programmable delay line 604 is updated with the new programmable delay. In other words, by holding the outputs of flip-flops 510 and 512 constant, it is not possible for flip-flops 510 and 512 to capture an output from one of delay cells 802 while a clock signal propagates through delay cells 802 and thereby cause a glitch an a subsequent transmission error.

After the long clock pulse, training logic 417 at node 104 waits for three clock edges and then causes its training packet generator 415 to send 512 successive cycles of training data to node 106. At each clock edge, the RNG in training packet generator 415 provides 18 bits of training data to the data lines in link 102.

Concurrently, training logic 417 at node 106 causes its training packet generator 415 to generate expected data from the same RNG seed. Training logic 417 then causes its error detector 433 to verify the expected data against the training data received from node 104. Error detector 433 checks the training data bit by bit for all the bits that are not masked according to a Link Training Mask Register (described later) in registers 413. Alternatively, individual bits can be selected according to the Link Training Mask Register.

Error detector 433 at node 106 also checks the running even parity for the Inv signals encoded in the Vld signals. The Inv and Vld signals have the same semantic for the training data as for a regular packet. When a data mismatch or a parity error is detected, error detector 433 at node 106 notifies training logic 417 at node 106, which then writes a LINK_TRAIN_PACKET_ERR bit in a Link Training Control Register (described later) in registers 413.

A double-bit error on the Vld and Inv signals may go undetected if only errors of this type happen during the same training burst. However, it is expected that such errors will happen along with errors on the data signals during the same training burst using the same programmable delay.

To start the link training, node controller 416 at node 104 sets a LINK_TRAIN_START bit to 1 in its Link Training Control Register (described later) in registers 413. In response, training logic 417 at node 104 clears a LINK_TRAIN_ISSUED bit to 0. Training logic 417 sets the LINK_TRAIN_ISSUED bit back to 1 when the training packet has been issued.

Prior to receiving the training data from node 104, training logic 417 at node 106 clears a LINK_TRAIN_RECV_DONE bit and a LINK_TRAIN_PACKET_ERR in its Link Training Control Register in registers 413. Training logic 417 sets the LINK_TRAIN_RECV_DONE bit to 1 when the complete training packet has been received. Training logic 417 further sets the LINK_TRAIN_PACKET_ERR bit in its Link Training Control Register in registers 413 when either of the following conditions is true:

(1) Any data cycle received during the training burst does not match the value calculated by the receiver RNG.

(2) There are one or multiple parity errors in the training packet.

To implement the link training mode, nodes 104 and 106 use registers 413 to set control bits and store the result of optimum delay. Each of registers 413 is listed in the following tables.

TABLE 3

Link Training Offset Register at Sending Node.

| Field | Bits | Mode | Reset State | Description |
|---|---|---|---|---|
| Training Offset | 7:0 | R/W | 0 | Signed value of the relative offset (in number of delay cells) to add/subtract delay to the programmable delay line. |

TABLE 4

Link Training Mask Register at Receiving Node.

| Field | Bits | Mode | Reset State | Description |
|---|---|---|---|---|
| Mask | 17:0 | R/W | 0x3ffff | Mask for the data received during training cycle. Only data bits that are set to 1 are compared. |

TABLE 5

Link Training Seed Register at Sending and Receiving Nodes.

| Field | Bits | Mode | Reset State | Description |
|---|---|---|---|---|
| RNG Seed | 17:0 | R/W | 0 | Seed for the link training pseudo random number generator. The pseudo-random number generator is reset when this register is written. A value ≠ 0 must be used. |

TABLE 6

Link Training Control Register at Sending and Receiving Node.

| Field | Bits | Mode | Reset State | Description |
|---|---|---|---|---|
| LINK_TRAIN_ISSUED | 30 | R | 0 | Link Training mode completion for link transmitter. When a training packet is issued by writing a bit in the LINK_TRAIN_START field, the corresponding bit is cleared in this field. When the training packet has been fully issued, the corresponding bit is set to 1. |
| Rsvd | 23:29 | R | 0 | Reserved. |
| LINK_TRAIN_PACKET_ERR | 22 | R/W1C | 0x00 | Link Training Packet Error. Data comparison was erroneous in the link receiver. This bit is set to 1 when the received data does not match the data generated by the pseudo-random number generator and the corresponding LINK_TRAIN_RECV_DONE = 1. This bit is also set to 1 when parity error is detected and the corresponding LINK_TRAIN_RECV_DONE = 1. These bits are cumulative in the sense that a successful data comparison on a Link Training Packet does not clear them. |

TABLE 6-continued

Link Training Control Register at Sending and Receiving Node.

| Field | Bits | Mode | Reset State | Description |
|---|---|---|---|---|
| | | | | A succession of Link Training Packets can be issued and then the LINK_TRAIN_PACKET_ERR bit checked to see if one or potentially multiple errors occurred. |
| Rsvd | 15:21 | R | 0x0 | Reserved. |
| LINK_TRAIN_RECV_DONE | 14 | R/W1C | 0x00 | Training data comparison is done in link receivers. The corresponding bit is set to 1 when the link receiver detects the end of the training packet received. |
| Rsvd | 7:13 | R | 0x0 | Reserved. |
| LINK_TRAIN_START | 6 | W | 0x00 | Link Training mode start for link transmitter. Setting a bit in this field to 1 starts Link Training on the corresponding link. The corresponding bit in the LINK_TRAIN_ISSUED field is automatically cleared when a LINK_TRAIN_START bit is set to 1. |
| Rsvd | 0:5 | R | 0x0 | Reserved. |

Figure 9:
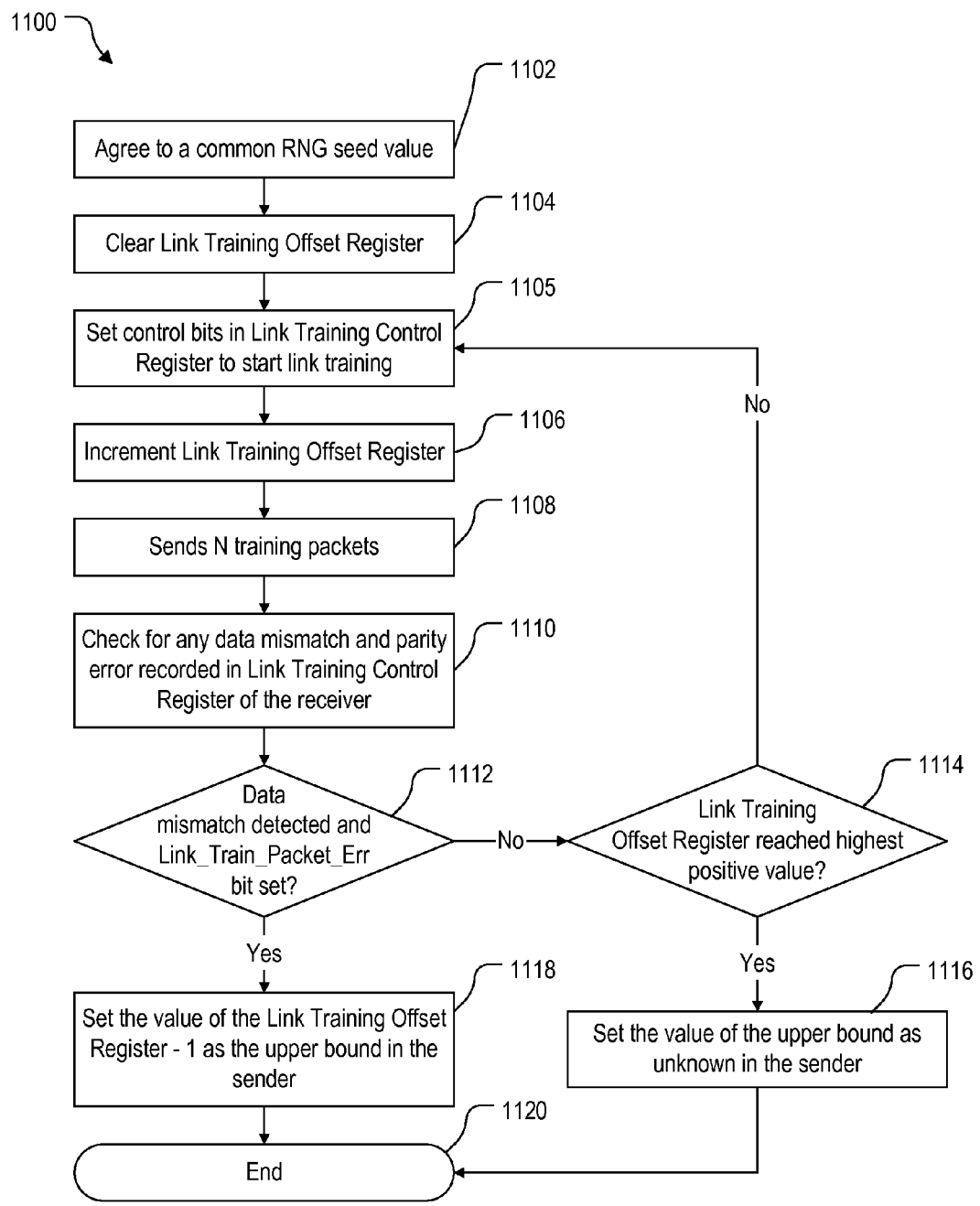
FIGS. 9, 10, and 11 are flowcharts of method for optimizing the alignment between data and clock signals over the link of FIG. 1 in embodiments of the invention.
Figure 10:
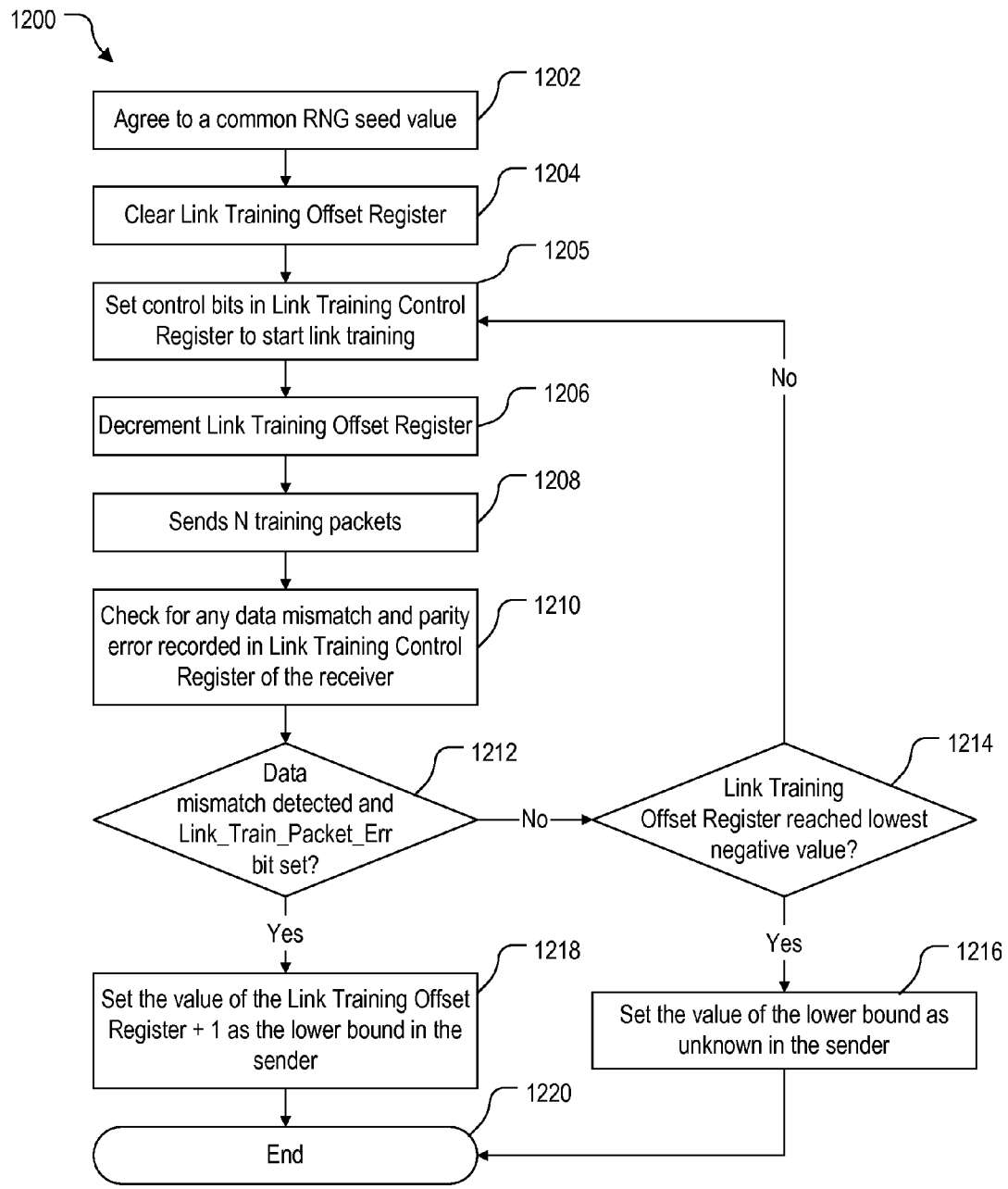
Figure 11:
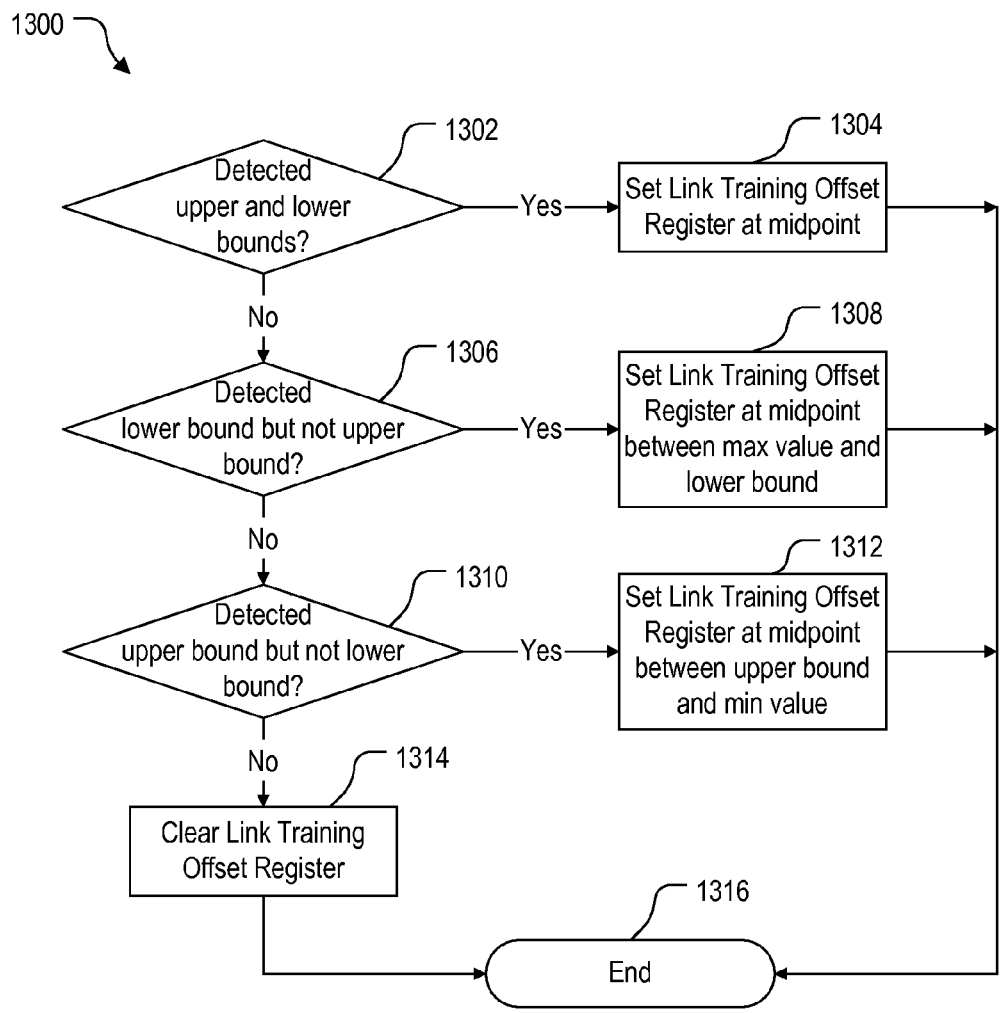

FIGS. 9, 10, and 11 illustrate a method for node 104 to optimize the alignment of data and strobe signals over link 102 to node 106 using the previously introduced link training scheme in one embodiment of the invention. Specifically, FIG. 9 illustrates a method 1100 to determine an upper bound of the optimal alignment, FIG. 10 illustrates a method 1200 to determine a lower bound of the optimal alignment, and FIG. 11 illustrates a method 1300 to determine the optimal alignment from the upper and lower bounds. These methods are implemented by software executed on node controllers 416 at nodes 104 and 106.

Referring to method 1100 in FIG. 9, in step 1102, node controllers 416 of node 104 and 106 exchange the RNG seed value. Node controller 416 of node 104 writes the RNG seed value in the Link Training Seed Register in its registers 413. Node controller 416 of node 106 writes the RNG seed value in the Link Training Seed Register in its registers 413. Step 1102 is followed by step 1104. Although each node is described with only one seed register, it is possible for each node to have two seed registers so they can train their link in both directions at the same time with different seeds.

In step 1104, node controller 416 of nodes 104 clears the Link Training Offset Register in registers 413 that stores the programmable delay provided by programmable delay line 604. Step 1104 is followed by step 1105.

In step 1105, node controller 416 of node 104 sets the Link_Train_Start bit to 1 in the Link Training Control Register in registers 413 at node 104. In response, training logic 417 clears the Link_Trained_Issued bit to 0 in the Link Training Control Register in registers 413.

In anticipation of receiving one or more training packets from node 104, node controller 416 of node 106 clears the LINK_TRAIN_RECV_DONE bit and the LINK_TRAIN_PACKET_ERR bit in the Link Training Control Registers in registers 413 at node 106. Step 1105 is followed by step 1106.

In step 1106, node controller 416 of node 104 increments the value in the Link Training Offset Register in registers 413 at node 104. Step 1106 is followed by step 1108.

In step 1108, training logic 417 of node 104 (1) enables training packet generator 415 to send a training packet with the pseudo-header and the training data over link 102 to node 106, (2) enables strobe stretcher 508 to provide the long clock pulse after the pseudo-header and before the training data, and (3) enables register 612 to update programmable delay line 604 with a new programmable delay from the Link Training Offset Register during the long clock pulse. Node controller 416 can also send additional packets of training data over link 102 for additional testing after programmable delay line 604 has been updated. After sending the training packet, training logic 417 clears the Link_Train_Start bit to 0 and sets the Link_Trained_Issued bit to 1 in the Link Training Control Register in registers 413.

In response to the pseudo-header from node 104, training logic 417 of node 106 causes training packet generator 415 to generate expected data from the same RNG seed and then uses error detector 433 to verify the expected data against the training data received from node 104. Error detector 433 checks the training data bit by bit and the parity and informs training logic 417 of any error. When all of the training data has been received, training logic 417 sets the LINK_TRAIN_RECV_DONE bit to 1 in the Link Training Control Register in registers 413. When data mismatch or parity error is detected, training logic 417 sets the LINK_TRAIN_PACKET_ERR bit to 1 in the Link Training Control Register in registers 413. Step 1108 is followed by step 1110.

In step 1110, node controller 416 of node 106 checks for data mismatch and parity error in the transmission of the training data. Node controller 416 does this by reading the LINK_TRAIN_PACKET_ERR bit in the Link Training Control Register in registers 413. Node controller 416 then communicates the result using normal packets over link 102 with the default clock delay to node 104. Alternatively, node controller 416 communicates the result using side band connection 112 to node 104. Step 1110 is followed by step 1112.

In step 1112, node controller 416 of node 104 determines from node 106 if there has been any data mismatch or parity error. If not, then step 1112 is followed by 1114. If there has been a data mismatch or parity error, then step 1112 is followed by step 1118.

In step 1114, node controller 416 of node 104 determines if the Link Training Offset Register in registers 413 has reached its highest value. If so, then step 1114 is followed by step 1116. Otherwise step 1114 is followed by step 1105 and method 1100 repeats until an upper bound of the optimal delay has been found.

In step 1116, node controller 416 of node 104 sets the upper bound of the optimal delay as unknown. Step 1116 is followed by step 1120, which ends method 1100.

In step 1118, node controller 416 of node 104 sets the upper bound of the optimal delay as the value stored in the Link Training Offset Register minus 1 (i.e., the previous value in the Link Training Offset Register). Step 1118 is followed by step 1120, which ends method 1100.

Method 1200 is very similar to method 1100 except the value in the Link Training Offset Register in registers 413 is decremented instead of incremented. Referring to FIG. 10, in step 1202, node controllers 416 of node 104 and 106 exchange the RNG seed value. Node controller 416 of node 104 writes the RNG seed value in the Link Training Seed Register in its registers 413. Node controller 416 of node 106 writes the RNG seed value in the Link Training Seed Register in its registers 413. Step 1202 is followed by step 1204.

In step 1204, node controller 416 of nodes 104 clears the Link Training Offset Register in registers 413 that stores the programmable delay provided by programmable delay line 604. Step 1204 is followed by step 1205.

In step 1205, node controller 416 of node 104 set the Link_Train_Start bit to 1 in the Link Training Control Register in registers 413 at node 104. In response, training logic 417 clears the Link_Trained_Issued bit to 0 in the Link Training Control Registers in registers 413.

In anticipation of receiving one or more training packets from node 104, node controller 416 of node 106 clears the LINK_TRAIN_RECV_DONE bit and the LINK_TRAIN_PACKET_ERR bit in the Link Training Control Registers in registers 413. Step 1205 is followed by step 1206.

In step 1206, node controller 416 of node 104 decrements the value in the Link Training Offset Register in registers 413. Step 1206 is followed by step 1208.

In step 1208, training logic 417 of node 104 (1) enables training packet generator 415 to send a training packet with the pseudo-header and the training data over link 102 to node 106, (2) enables strobe stretcher 508 to provide the long clock pulse after the pseudo-header and before the training data, and (3) enables register 612 to update programmable delay line 604 with a new programmable delay from the Link Training Offset Register during the long clock pulse. Node controller 416 can also send additional packets of training data over link 102 for additional testing after programmable delay line 604 has been updated. After sending the training packet, training logic 417 clears the Link_Train_Start bit to 0 and sets the Link_Trained_Issued bit to 1 in the Link Training Control Registers in registers 413 at node 104.

In response to the pseudo-header from node 104, training logic 417 of node 106 causes training packet generator 415 to generate expected data from the same RNG seed and then uses error detector 433 to verify the expected data against the training data received from node 104. Error detector 433 checks the training data bit by bit and the parity and informs training logic 417 of any error. When all of the training data has been received, training logic 417 sets the LINK_TRAIN_RECV_DONE bit to 1 in the Link Training Control Register in registers 413. When data mismatch or parity error is detected, training logic 417 sets the LINK_TRAIN_PACKET_ERR bit to 1 in the Link Training Control Register in registers 413. Step 1208 is followed by step 1210.

In step 1210, node controller 416 of node 106 checks for data mismatch and parity error in the transmission of the training data. Node controller 416 does this by reading the LINK_TRAIN_PACKET_ERR bit in the Link Training Control Register in registers 413. Node controller 416 then communicates the result using normal packets over link 102 with the default clock delay to node 104. Alternatively, node controller 416 communicates the result using side band connection 112 to node 104. Step 1210 is followed by step 1212.

In step 1212, node controller 416 of node 104 determines from node 106 if there has been any data mismatch or parity error. If not, then step 1212 is followed by 1214. If there has been a data mismatch or parity error, then step 1212 is followed by step 1218.

In step 1214, node controller 416 of node 104 determines if the Link Training Offset Register in registers 413 has reached its lowest value. If so, then step 1214 is followed by step 1216. Otherwise step 1214 is followed by step 1205 and method 1200 repeats until a lower bound of the optimal delay has been found.

In step 1216, node controller 416 of node 104 sets the lower bound of the optimal delay as unknown. Step 1216 is followed by step 1220, which ends method 1200.

In step 1218, node controller 416 of node 104 sets the lower bound of the optimal delay as the value stored in the Link Training Offset Register plus 1 (i.e., the previous value in the Link Training Offset Register). Step 1218 is followed by step 1220, which ends method 1200.

Referring to method 1300 in FIG. 11, in step 1302, node controller 416 of node 104 determines if both upper and lower bounds have been detected in methods 1100 and 1200. If so, then method 1302 is followed by step 1304. Otherwise step 1302 is followed by step 1306.

In step 1304, node controller 416 of node 104 sets the value in its Link Training Offset Register in registers 413 at the midpoint between the upper and the lower bounds. Step 1304 is followed by step 1316, which ends method 1300.

In step 1306, node controller 416 of node 104 determines if the lower bound has been detected but the upper bound has not been detected (i.e., the upper bound is unknown). If so, then step 1306 is followed by step 1308. Otherwise step 1306 is followed by step 1310.

In step 1308, node controller 416 of node 104 sets the value in its Link Training Offset Register in registers 413 at the midpoint between the maximum value of the signed value (e.g., +63) and the lower bound. Step 1304 is followed by step 1316, which ends method 1300.

In step 1310, node controller 416 of node 104 determines if the upper bound has been detected but the lower bound has not been detected (i.e., the lower bound is unknown). If so, then step 1310 is followed by step 1312. Otherwise step 1310 is followed by step 1314.

In step 1312, node controller 416 of node 104 set the value in its Link Training Offset Register in registers 413 at the midpoint between the minimum value of the signed value (e.g., −63) and the upper bound. Step 1312 is followed by step 1316, which ends method 1300.

In step 1314, node controller 416 of node 104 clears its Link Training Offset Register in registers 413 because both the upper and the lower bounds are unknown. This then causes the clock signal to be sent over link 102 with the default clock delay. Step 1314 is followed by step 1316, which ends method 1300.

Figure 12:
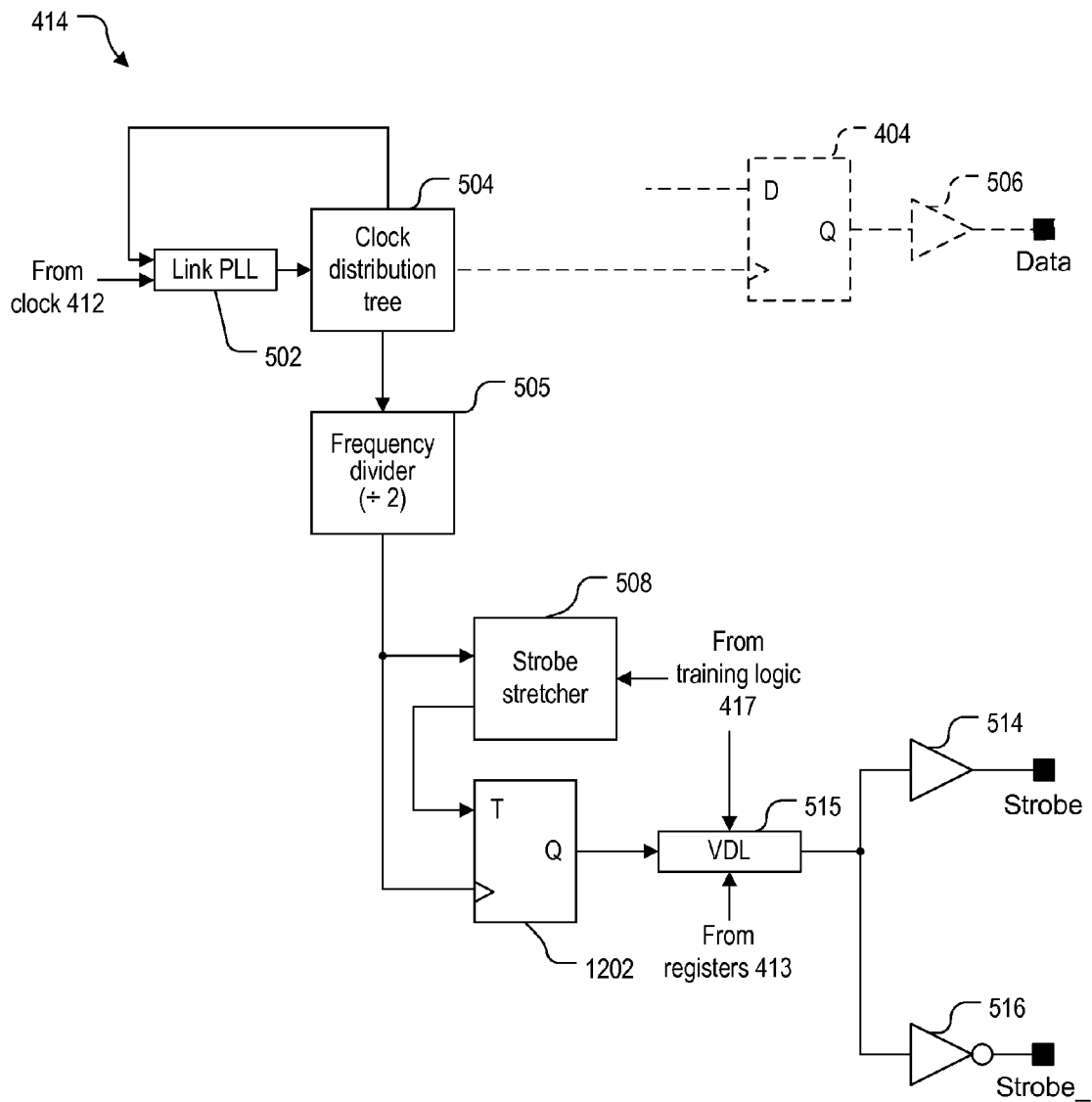
FIG. 12 is a block diagram of the clocking circuitry in the node circuitry of FIGS. 4A and 4B in another embodiment of the invention.

FIG. 12 illustrates another embodiment of clocking circuitry 414 in node 102. This embodiment of clocking circuit 414 is different from the embodiment illustrated in FIG. 5 in the following ways.

Frequency divider 505 provides the clock signal at half of the original frequency to the clock terminals of strobe stretcher 508 and a flip-flop 1202. Flip-flop 1202 has a control terminal coupled to the output of strobe stretcher 508, and an output coupled to the input of programmable VDL 515. When the control terminal of flip-flop 1202 receives the control signal in a first state from strobe stretcher 508, flip-flop 1202 outputs its clock input from frequency divider 505. When the control signal is in a second state, flip-flop 1202 holds its current output constant. In one embodiment, flip-flop 1202 is a T-type flip-flop. Programmable VDL 515 has an output coupled to the inputs of output buffer 514 and inverting output buffer 516 to provide differential strobe signals on link 102 to double the data transfer rate. The outputs of buffers 514 and 516 are coupled to Strobe and Strobe_pads.

During normal operation, strobe stretcher 508 provides the control signal in the first state to the control terminal of flip-flop 1202. When enabled by training logic 417 during link training, strobe stretcher 508 provides the control signal in the second state in order to hold the clock signal to VDL 515 constant for several clock cycles while training logic 417 updates the programmable delay of programmable VDL 515.

The long clock pulse masks any glitches that may occur when programmable delay line 604 is updated with the new programmable delay. By holding the outputs the clock signal constant, it is not possible to select an output from one of delay cells 802 while a clock signal propagates through delay cells 802 and thereby cause a glitch and a subsequent transmission error.

Various other adaptations and combinations of features of the embodiments disclosed are within the scope of the invention. For example, system 100 may include additional nodes where each node is connected by independent links to the remaining nodes. Numerous embodiments are encompassed by the following claims.

What is claimed is:

1. A method for a sender having a source-synchronous communication link with a receiver to optimize the link for data transmission, comprising:
   (A) setting a programmable delay of a clock signal to a default value, wherein the clock signal having the programmable delay at the default value ensures that the sender and the receiver can communicate over the link without any error;
   (B) sending header data and the clock signal to the receiver over the link, wherein the header data indicate a start of a training packet and the training packet comprises the header data and training data;
   (C) holding the clock signal in one state for multiple clock cycles;
   (D) during said holding, adjusting the programmable delay of the clock signal; and
   (E) after said holding, sending the training data and the clock signal to the receiver over the link.

2. The method of claim 1, further comprising:
   (F) determining if the receiver has received the training data without any error;
   (G) if the receiver has received the training data without any error:
      (i) determining if the value of the programmable delay of the clock signal has reached one of a largest possible value and a smallest possible value of the programmable delay;
      (ii) if the value of the programmable delay of the clock signal has not reached one of a largest possible value and smallest possible value, repeating steps (B), (C), (D), (E), (F), and (G).

3. The method of claim 2, further comprising:
(H) if the receiver has received the training data with error:
   (i) saving a prior value of the programmable delay of the clock signal as a first boundary for the programmable delay of the clock signal;
   (ii) averaging the first boundary and a second boundary for the programmable delay of the clock signal to determine an optimal value for the programmable delay of the clock signal; and
   (iii) setting the programmable delay of the clock signal to the optimal value.

4. The method of claim 3, wherein said adjusting the programmable delay comprises incrementing the programmable delay, the first boundary comprises an upper boundary for the programmable delay, and the second boundary comprises a lower boundary for the programmable delay determined from repeating above steps by decrementing the programmable delay.

5. The method of claim 3, wherein said adjusting the programmable delay comprises decrementing the programmable delay, the first boundary comprises a lower boundary for the programmable delay, and the second boundary comprises an upper boundary for the programmable delay determined from repeating above steps by incrementing the programmable delay.

6. The method of claim 2, wherein said determining if the receiver has received the training data without any error comprises:
   providing an identical seed value for a first pseudo-random number generator in the sender and a second pseudo-random number generator in the receiver;
   generating the training data with the first pseudo-random number generator using the identical seed value; and
   determining if the receiver has detected any data mismatch between (1) the training data and (2) data generated by the second pseudo-random number generator using the identical seed value.

7. The method of claim 2, wherein said determining if the receiver has received the training data without any error comprises checking a running parity of an invert signal transmitted along with the training data, where the invert signal indicating if the training data is to be inverted.

8. The method of claim 2, wherein step (G) further comprises:
   (iii) if the value of the programmable delay of the clock signal has reached one of the largest and the smallest possible values:
      (a) saving the value of the programmable delay of the clock signal as a first boundary for the programmable delay of the clock signal;
      (b) averaging the first boundary and a second boundary for the programmable delay of the clock signal to determine an optimal value for the programmable delay of the clock signal; and
      (c) setting the programmable delay of the clock signal to the optimal value.

9. The method of claim 2, wherein step (G) further comprises:
   (iii) if the value of the programmable delay of the clock signal has reached one of the largest and the smallest possible values:
      (a) saving the value of the programmable delay of the clock signal as a first boundary for the programmable delay of the clock signal;
      (b) determining if a second boundary for the programmable delay of the clock signal is at another one of the largest and the smallest possible values; and
      (c) if the second boundary for the programmable delay of the clock signal is at another one of the largest and the smallest possible values, resetting the programmable delay of the clock signal to the default value.

10. A first node having a source-synchronous communication link with a second node, the first node comprising:
   a training packet generator generating a training packet to the link, the training packet comprising a header and training data, the training packet generator including a pseudo-random number generator for generating the training data;

a clock generating a clock signal;

clocking circuitry for holding a strobe signal derived from the clock signal in a constant state for multiple clock cycles, the clocking circuitry comprising a variable delay line that delays the clock signal with a programmable delay; and training logic configured to:
(A) cause the training packet generator to generate the header and the training data;
(B) cause the clocking circuitry to hold the strobe signal in the constant state for multiple clock cycles after the training packet generator generates the header; and
(C) update the variable delay line with a new value of the programmable delay while the strobe signal is in the constant state for multiple clock cycles.

11. The first node of claim 10, wherein the clocking circuitry further comprises:
a strobe stretcher generating a first control signal in a first state for multiple clock cycles in response to a second control signal from the training logic;
a flip-flop comprising:
a control terminal receiving the first control signal from the strobe stretcher; and
a clock terminal coupled to receive the clock signal from the variable delay line;
an output buffer coupled to receive the clock signal from the flip-flop and generating the strobe signal to the link;
wherein:
the variable delay line is updated with the new value of the programmable delay in response to a third control signal from the training logic; and
the flip-flop outputs the clock signal to the output buffer when the first control signal is in a second state, and the flip-flop outputs the clock signal in the constant state when the first control signal is in the first state.

12. The first node of claim 11, wherein the variable delay line comprises:
a register outputting the programmable delay, the register being updated with the new value of the programmable delay in response to the third control signal from the training logic; and
a programmable delay line receiving the programmable delay and generating the delayed clock signal.

13. The first node of claim 12, wherein the pseudo-random number generator further generates expected data, the first node further comprising:
an error detector comprising inputs coupled to receive the expected data from the pseudo-random number generator and training data received from the second node, the error detector detecting mismatch between the expected data and the received training data.

14. The first node of claim 13, wherein the error detector further detects incorrect values of a running parity of an invert signal transmitted along with the training data, where the invert signal indicating if the training data is to be inverted.

15. The first node of claim 10, wherein the clocking circuitry further comprises:
a strobe stretcher generating a first control signal in a first state for multiple clock cycles in response to a second control signal from the training logic;
a flip-flop comprising:
a control terminal receiving the first control signal from the strobe stretcher;
a clock terminal coupled to the clock signal from the clock; and
an output terminal coupled to an input terminal of the variable delay line;
an output buffer coupled to receive the clock signal from the variable delay line and generating the strobe signal to the link;
wherein:
the variable delay line is updated with the new value of the programmable delay in response to a third control signal from the training logic; and
the flip-flop outputs the clock signal to the variable delay line when the first control signal is in a second state, and the flip-flop outputs the clock signal in the constant state when the first control signal is in the first state.

16. The first node of claim 15, wherein the variable delay line comprises:
a register outputting the programmable delay, the register being updated with the new value of the programmable delay in response to the third control signal from the training logic; and
a programmable delay line receiving the programmable delay and generating the delayed clock signal.

17. The first node of claim 16, wherein the pseudo-random number generator further generates expected data, the first node further comprising:
an error detector comprising inputs coupled to receive the expected data from the pseudo-random number generator and training data received from the second node, the error detector detecting mismatch between the expected data and the received training data.

18. The first node of claim 17, wherein the error detector further detects incorrect values of a running parity of an invert signal transmitted along with the training data, where the invert signal indicating if the training data is to be inverted.

* * * * *